United States Patent
Rogalski

(10) Patent No.: US 7,796,740 B2
(45) Date of Patent: Sep. 14, 2010

(54) SYSTEM AND METHOD FOR UNIVERSAL ADAPTATION OF A PSTN MODEM

(75) Inventor: Gary K. Rogalski, Richmond (CA)

(73) Assignee: VTech Telecommunications Limited, Hong Kong (HK)

( * ) Notice: Subject to any disclaimer, the term of this patent is extended or adjusted under 35 U.S.C. 154(b) by 1284 days.

(21) Appl. No.: 11/328,309

(22) Filed: Jan. 10, 2006

(65) Prior Publication Data

US 2007/0165831 A1    Jul. 19, 2007

(51) Int. Cl.
    *H04M 11/00* (2006.01)
(52) U.S. Cl. ............... 379/93.01; 379/93.29; 379/93.05
(58) Field of Classification Search ............. 379/93.01, 379/93.29, 93.05, 93.06, 93.09, 93.31, 93.32, 379/442, 443, 399, 92.01; 375/222, 241, 375/242, 340; 439/172
    See application file for complete search history.

(56) References Cited

U.S. PATENT DOCUMENTS

| | | | | |
|---|---|---|---|---|
| 5,127,041 A | * | 6/1992 | O'Sullivan | 455/557 |
| 6,091,906 A | * | 7/2000 | Hata | 396/206 |
| 6,128,373 A | * | 10/2000 | Mathe et al. | 379/93.29 |
| 6,427,011 B1 | * | 7/2002 | Sacca | 379/399.01 |
| 6,453,024 B1 | * | 9/2002 | Baker et al. | 379/93.29 |
| 2003/0228778 A1 | * | 12/2003 | Shang | 439/172 |

* cited by examiner

*Primary Examiner*—Melur Ramakrishnaiah
(74) *Attorney, Agent, or Firm*—McAndrews, Held & Malloy, Ltd.

(57) ABSTRACT

A modem adapter is provided to adapt a modem to operate with a telephone system. The modem adapter includes a conductor detector, a voltage generator, and a dial-tone generator. The conductor detector is configured to detect live conductors on a telephone jack. The voltage generator is configured to generate an on-hook line voltage comparable to that normally expected by the modem and to deliver the generated on-hook line voltage to the modem. The dial-tone generator is configured to generate and deliver to the modem a first dial tone different from the second dial tone delivered by a telephone system to which the modem is attempting communication. A method for adapting a modem to a telephone system is also provided.

20 Claims, 2 Drawing Sheets

SYSTEM AND METHOD FOR UNIVERSAL ADAPTATION OF A PSTN MODEM

BACKGROUND

1. Field of the Invention

The present invention relates generally to modem adapters. More specifically, the present invention relates to a universal adapter for a modem, such as a PSTN modem, that allows for modem connectivity over a variety of telephone systems.

2. Background of the Invention

Computers manufactured for use in North America, and the communications programs that are intended to operate on these computers, typically expect certain line conditions for proper operation, for example, line voltage, presence of a physical RJ11 connection, dial tone, etc. In some locations both inside and outside of North America, some of these conditions may not be present. This can result in faulty operation, including complete failure, of computer modems.

In most North American countries, the PSTN connection is made via the inner two conductors on an RJ11 jack. Outside of these countries, this connection may be made via the outer two conductors. In this scenario no physical connection would be made between the computer modem and the actual PSTN connection.

Another problem arises from differences in dial tones. The dial tone cadence in some countries can be different enough from what is expected by the computer that the modem fails to detect the dial tone or may even incorrectly interpret the dial tone as a busy tone, among other problems. In either of these cases, or other similar situations whereby the modem is confused by an unfamiliar dial tone, the modem will not dial.

Some modems also require detection of line voltage within a certain range in order to qualify that the line condition is appropriate for dialing. Central office switches in countries outside North America may or may not confirm these requirements. Such discrepancies between North American and other countries can cause modem failure.

In many cases, computers used in hotels suffer from similar problems. A computer used at a hotel will often access a PSTN connection through a PBX, which can affect the dial tone cadence and line voltage. Either of these conditions can cause the modem to fail.

To overcome some of these problems various solutions have been attempted. For example, certain hardware is available that allows connectivity between different kinds of telephone jacks. These adapters, however, do not sense which of the conductors are "live," nor do they switch the inner pair for the outer pair as may be required.

Software solutions have also been tried. For example, some communications programs allow for disabling of some of the dialing safeguards such as dial tone detection. This solution often results in inconsistent operation and may be difficult to locate within the program. Often times, even with such a solution in place, users do not have the requisite computer skills to implement the necessary software changes, resulting in poor modem performance.

BRIEF SUMMARY OF THE INVENTION

According to one exemplary embodiment, a modem adapter of the invention includes a conductor detector to detect live conductors on a telephone jack, a voltage generator to generate an on-hook line voltage comparable to that normally expected by the modem and to deliver the generated on-hook line voltage to the modem, and a dial-tone generator to generate and deliver to the modem a first dial tone different from the second dial tone delivered by a telephone system to which the modem is attempting communication.

According to another exemplary embodiment, a method for adapting a modem to a foreign telephone system includes detecting which conductors on a telephone jack are live and routing an active connection to the live conductors, generating an on-hook line voltage comparable to that expected by the modem and delivering the generated on-hook line voltage to the modem, and generating and delivering to the modem a dial tone different from the dial tone delivered by the foreign telephone system.

According to another exemplary embodiment, a modem adapter of the invention includes a main control unit, one or more comparators connected to the telecommunications line for sensing a live connector pair, a first switch for connecting to the live connector pair, and a second switch for connecting the modem to the telecommunications line. The main control unit generates and sends a dial tone different from a dial tone received from the telecommunications line to the modem and, upon detecting modem tones from the modem, sends a control signal to the second switch to connect the modem to the telecommunications line.

DETAILED DESCRIPTION OF THE INVENTION

Figure 1:
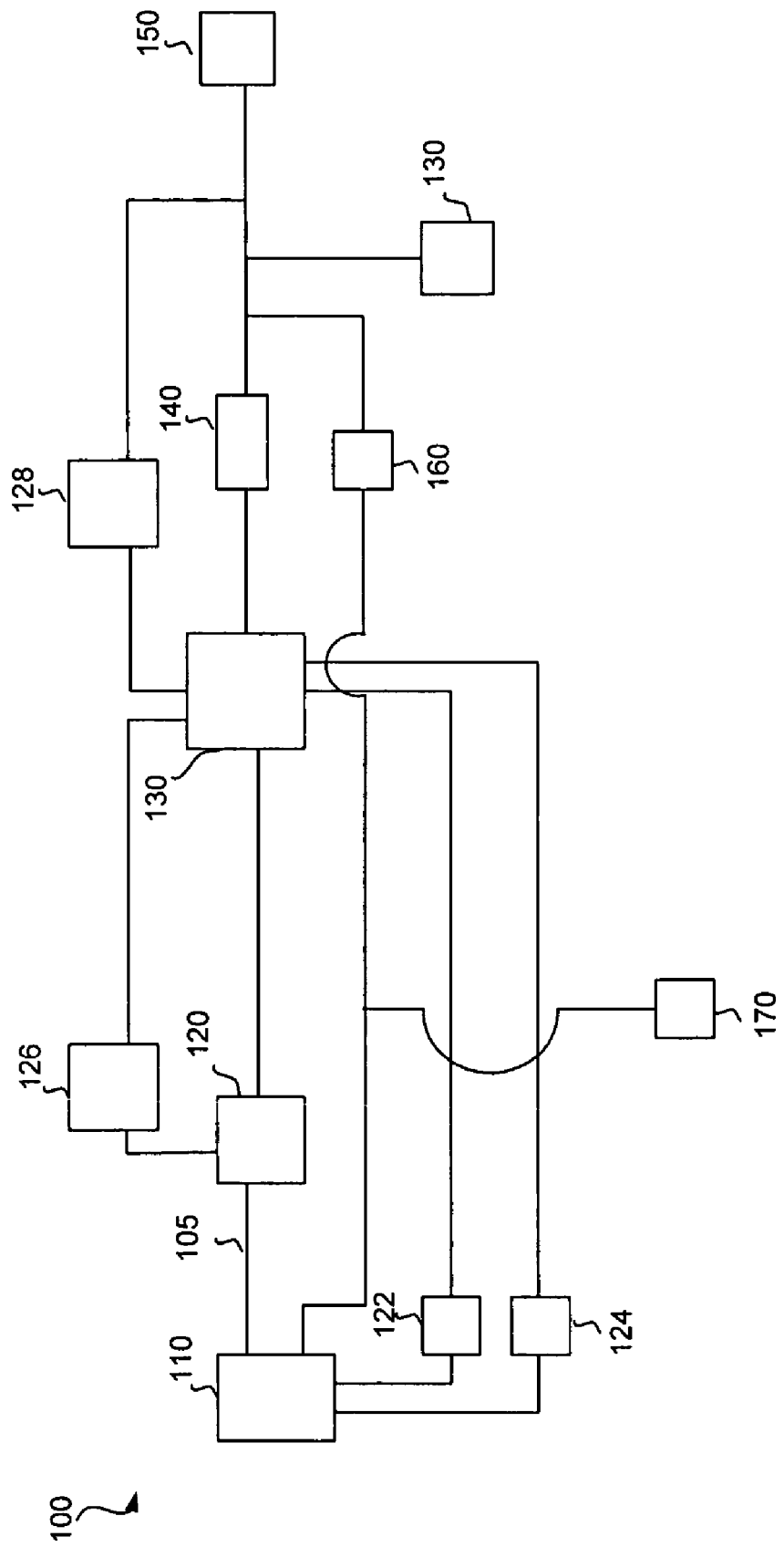
FIG. 1 is a schematic functional diagram showing an exemplary embodiment of a universal modem adapter according to the present invention.

FIG. 1 depicts a functional diagram of an exemplary modem adapter system 100 according to the present invention. System 100 is used to provide a connection between a phone jack 110 and a computer modem 150. A telephone line 105 capable of supporting many different types of telephone connections found around the world is connected to jack 110. Jack 110 is preferably an RJ11 connection or other phone jack capable of providing a PSTN connection to a central office switch for handling communication signals to and from a computer modem.

An analog switch 120 is connected to jack 110 to switch to a live, or active, Tip/Ring pair of the jack. With most phone jacks, there are four conductors. In some locations or localities the live connection includes the outside pair of conductors and in other locations or localities, the live connection includes the inside pair. Analog switch 120 is capable of connecting the signal to either of the two sets of conductors.

A pair of comparators 122 and 124 are provided to monitor the signal available at jack 110 and along with a main control unit (MCU) 130 are capable of determining which two of the four conductors available at jack 110 are "live". As used herein, "live" is intended to mean connected to tip and ring at a central control office switch. Comparators 122 and 124 communicate with MCU 130, which, in turn, communicates with switch 120. MCU 130 processes the information from comparators 122 and 124 and sends a control signal to switch 120. Upon receiving the control signal from MCU 130, switch 120 then routes the active connection to the conductors it detected as being live.

Also connected to MCU 130 is a dial tone detect device 126. Dial tone detect device 126 is provided between jack 110 and MCU 130 and may include a high impedance differential amplifier that feeds the analog dial tone signal to MCU 130 for analysis. As seen in FIG. 1, dial tone detect device 126 is positioned between switch 120 and MCU 130. A second detecting device 128 that is used for detecting modem tones is provided on the modem side of the system to detect if modem tones are being generated by modem 150. When modem tones are detected by device 128, MCU 130 closes switch 160 to complete the connection between the computer and the PSTN line if this connection has not already been made.

Connected between switch 160 and modem 150, is a voltage generator 130 capable of generating on-hook line voltages comparable to what a typical telephone company would provide. When activated, voltage generator 130 delivers this on-hook line voltage to the modem connection to "fool" the modem into thinking it is receiving its normal expected input of on-hook line voltage. In providing this voltage, generator 130 allows modem 150 to believe it is operating under its normal operating conditions.

One function provided by MCU 130 is to act as a dial-tone generator to provide a dial tone to modem 150 that is in accordance with dial tones for which modem 150 is programmed. When system 100 determines that modem tones are being generated, switch 140 is closed so that the dial tone generated by MCU 130 can be sent to modem 150 and allow modem 150 to operate in its expected environment.

In addition, an isolation device 160 is provided as part of the exemplary system. Isolation device 160 isolates modem 150 from the PSTN connection until MCU 130 determines that both sides of the communications session (e.g., the modem and the PSTN connection) are ready to be connected. Once system 100 determines that both the modem and PSTN connection are ready to be connected, MCU 130 sends a control signal to isolation device 160 to complete the circuit and allow for communication between the PSTN connection and modem 150. In essence, system 100 sits between the PSTN connection on one side and modem 150 on the other side and isolates each side from the other by providing expected connection environments to each side. Once both sides have been properly set up to be connected, system 100 removes a barrier created by isolation device 160 and completes the connection.

A listening device 170 may also be included in the system for listing in on the audible tones active on the PSTN line. This listener preferably operates so as not to load down the PSTN line.

System 100 thus allows for a standard modem to connect to telephone systems around the world without the associated difficulties encountered with foreign systems. System 100 may also be modified so as to allow for a foreign modem to operate according to its expected conditions outside of its expected input conditions. For example, rather than being programmed to provide North American dial tones, etc., the system may be set up to provide European dial tones and operating conditions if a European modem is being connected to a foreign telephone system.

Figure 2:
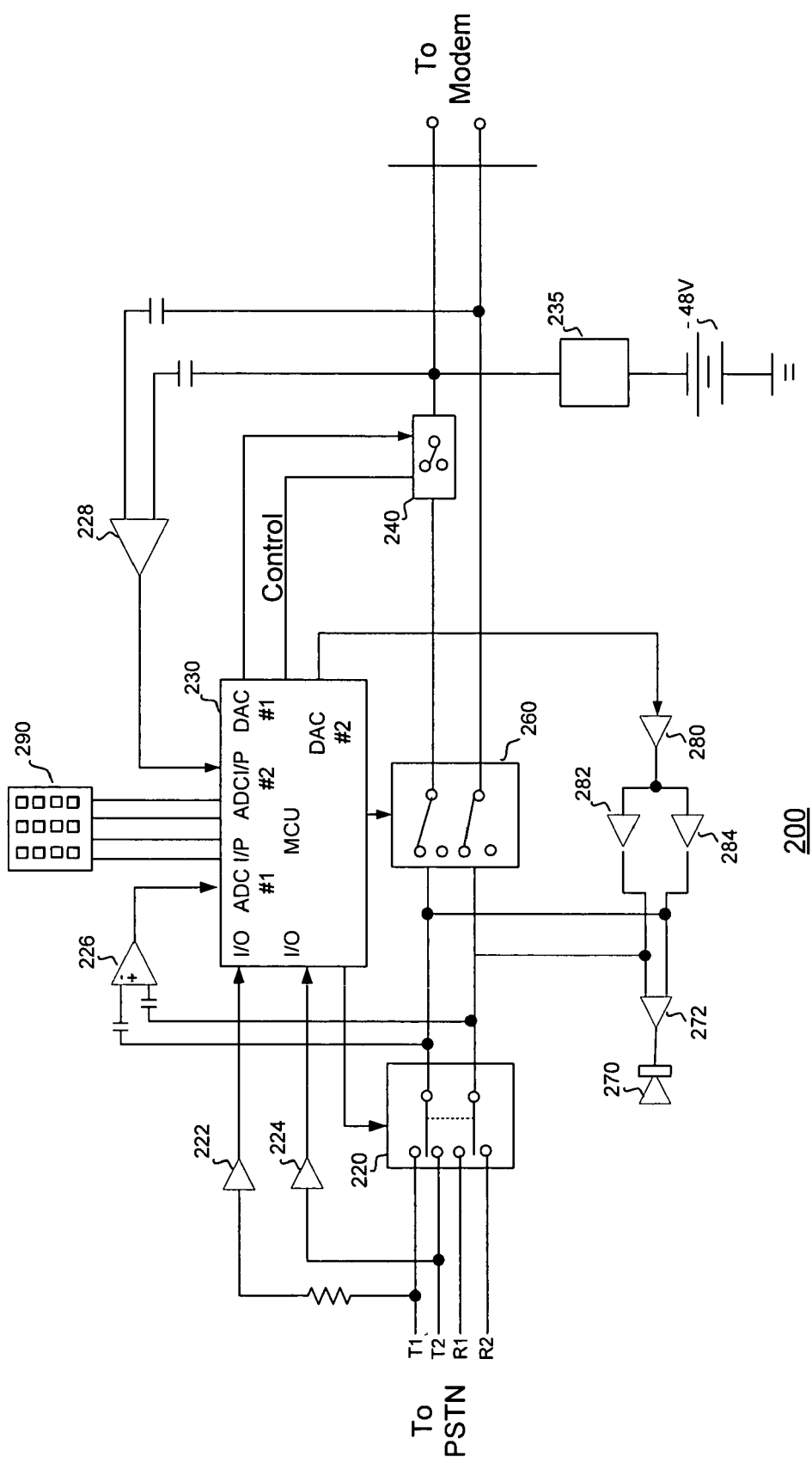
FIG. 2 is a schematic diagram of an exemplary embodiment encompassing functions depicted in FIG. 1.

FIG. 2 depicts a schematic diagram of a modem connection system 200 according to one exemplary embodiment of the present invention. On the left side of FIG. 2 is a PSTN connection that would be provided via a jack similar to that described above with respect to jack 110. On the right side of FIG. 2 sits a modem. System 200 sits between the PSTN connection and ultimately allows for connection of the modem to the PSTN connection. Where possible, similar reference numerals are used to refer to elements of FIG. 2 that correspond with functional elements described in FIG. 1.

In the center of system 200 resides MCU 230. MCU 230 is connected to a variety of detection and monitoring devices as well as to several switches to allow for proper connection of the modem to the PSTN connection. MCU 230 processes information sent to it and provides control signals to operate the various switches that ultimately connect the modem to the PSTN system. MCU 230 also provides some of the functionality described above with respect to "fooling" each side into believing it is operating under its expected operating conditions.

First, a pair of comparators 222 and 224 are provided to sense when line voltage is present on a given tip or ring connection and then feed that information to MCU 230 at a correct logic level. MCU 230 then processes that information and generates a control signal to be sent to switch 220. Switch 220, based on the control signal sent from MCU 230, then connects to the proper live pair of connectors.

Also connected between MCU 230 and the PSTN connection is a high impedance differential amplifier 226. Amplifier 226 feeds the analog dial tone signal to MCU 230 for analysis. On the other side of MCU 230 is connected another differential amplifier 228, which is connected to the line going to/from the modem. Differential amplifier 228 acts in a similar capacity to amplifier 226, but is used to detect modem tones. Once modem tones are detected, MCU 230 will need to expediently closes switches 240 and 260 to complete the connection between the computer modem and the PSTN line, if this has not already occurred.

Switch 240 is provided between the modem on one side and switch 260 and MCU 230 on the other side. Switch 240, through DAC output 1 of MCU 230 feeds an artificial dial tone to the computer modem to simulate an off-hook condition. Switch 235 connects −48VDC to the tip connection of the computer modem to simulate a normal on-hook condition.

Three amplifiers 280, 282, and 284 feed DTMF output from DAC output 2 of MCU 230 to the PSTN line. These amplifiers will typically be needed only if manual dialing is required. Audio speaker 270 and its associated amplifier 272 are connected to the line to allow for an audible indication of what is occurring on the line. This may be useful for a user to monitor what is occurring with the modem connection.

It may be possible to allow for hands free operation within system 200 by adding a 2:4 wire hybrid circuit, a microphone, and a microphone pre-amp as well as speakerphone switching circuitry. Such hands free operation and the associated componentry should be well known to those of skill in the art. A keypad 290 may also be provided to aid in manual interface with system 200.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A modem adapter for coupling between a modem and a telecommunications line, comprising:
   a conductor detector to detect live conductors on a telephone jack;
   a voltage generator to generate an on-hook line voltage comparable to that normally expected by the modem and to deliver the on-hook line voltage to the modem; and
   a dial-tone generator to generate and deliver to the modem a first dial tone different from a second dial tone delivered by a telecommunications system to which the modem is attempting communication.

2. The modem adapter of claim 1, further comprising a modem isolation device for facilitating delivery of the on-hook line voltage and the first dial tone to the modem without affecting connection to a telephone line associated with the telephone system.

3. The modem adapter of claim 1, further comprising a listening device to listen in on audible tones active on a telephone line associated with the telephone system.

4. The modem adapter of claim 3, wherein the listening device listens in without loading down the telephone line.

5. The modem adapter of claim 1, further comprising an off-hook detection device to detect when the modem goes off hook.

6. The modem adapter of claim 5, wherein the off-hook detection device establishes a transparent connection to a telephone line associated with the telephone system that is ready to accept dial digits.

7. The modem adapter of claim 1, wherein the modem adapter is configured to work with modems programmed to operate according to North American operating parameters.

8. The modem adapter of claim 1, wherein the modem adapter is configured to work with modems programmed to operate according to European operating parameters.

9. The modem adapter of claim 1, further comprising speakerphone componentry to allow for hands-free operation.

10. The modem adapter of claim 1, further comprising a plurality of amplifiers to allow for manual dialing.

11. A method for adapting a modem to operate with a telephone system, comprising:
    detecting which conductors on a telephone jack are live;
    routing an active connection to the detected live conductors;
    generating an on-hook line voltage comparable to that expected by the modem during normal operation;
    delivering the on-hook line voltage to the modem; and
    generating and delivering to the modem a first dial tone different from a second dial tone delivered by the telephone system.

12. The method of claim 11, further comprising isolating the modem from a telephone line associated with the telephone system to facilitate delivery of the on-hook line voltage and the first dial tone to the modem without affecting connection to the telephone line.

13. The method of claim 11, further comprising listening in on audible tones active on a telephone line associated with the telephone system.

14. The method of claim 12, wherein the listening in is performed without loading down the telephone line.

15. The method of claim 11, further comprising detecting an off-hook status of the modem.

16. The method of claim 15, further comprising establishing a transparent connection to a telephone line associated with the telephone system that is ready to accept dial digits.

17. A modem adapter for coupling between a modem and a telecommunications line, comprising:
    a main control unit;
    one or more comparators connected to the telecommunications line for sensing a live connector pair;
    a first switch for connecting to the live connector pair; and
    a second switch for connecting the modem to the telecommunications line,
    the main control unit generating and sending a dial tone different from a dial tone received from the telecommunications line to the modem and, upon detecting modem tones from the modem, sending a control signal to the second switch to connect the modem to the telecommunications line.

18. The modem adapter of claim 17, further comprising a differential amplifier for detecting the modem tones sent from the modem.

19. The modem adapter of claim 17, wherein the main control unit comprises one or more analog to digital converters and one or more digital to analog converters.

20. The modem adapter of claim 17, further comprising a speaker connected between the modem and the telecommunications line to provide for audible monitoring of the coupling.

* * * * *